US012244069B2

(12) United States Patent
Sissoev et al.

(10) Patent No.: US 12,244,069 B2
(45) Date of Patent: Mar. 4, 2025

(54) CROSS DIPOLE CIRCULARLY POLARIZED ANTENNA

(71) Applicant: AEROANTENNA TECHNOLOGY, INC., Chatsworth, CA (US)

(72) Inventors: Alex Sissoev, Chatsworth, CA (US); Wenhao Zhu, Chatsworth, CA (US); Anthony de Vera, Porter Ranch, CA (US); Joseph Klein, Chatsworth, CA (US)

(73) Assignee: AEROANTENNA TECHNOLOGY, INC., Chatsworth, CA (US)

( * ) Notice: Subject to any disclaimer, the term of this patent is extended or adjusted under 35 U.S.C. 154(b) by 136 days.

(21) Appl. No.: 17/834,198

(22) Filed: Jun. 7, 2022

(65) Prior Publication Data

US 2023/0395995 A1 Dec. 7, 2023

(51) Int. Cl.
*H01Q 21/26* (2006.01)
*H01Q 1/28* (2006.01)
*H01Q 1/42* (2006.01)
*H01Q 1/48* (2006.01)

(52) U.S. Cl.
CPC ............... *H01Q 21/26* (2013.01); *H01Q 1/28* (2013.01); *H01Q 1/42* (2013.01); *H01Q 1/48* (2013.01)

(58) Field of Classification Search
CPC ........... H01Q 21/26; H01Q 1/28; H01Q 1/42; H01Q 1/48
See application file for complete search history.

(56) References Cited

U.S. PATENT DOCUMENTS 2,934,762 A * 4/1960 Smedes ................ H01Q 19/175 343/756
3,388,400 A * 6/1968 Veldhuis ................ H01Q 21/24 343/822
3,701,157 A * 10/1972 Uhrig ..................... H01Q 21/24 343/797
4,109,254 A * 8/1978 Woloszczuk ........... H01Q 13/18 343/822
5,173,715 A * 12/1992 Rodal .................... H01Q 21/26 343/797
5,208,603 A * 5/1993 Yee .................... H01Q 15/0026 343/872

(Continued)

FOREIGN PATENT DOCUMENTS

CN 105684217 B * 1/2019 ............... H01Q 1/12
EP 1232538 B1 * 11/2008 ............... H01Q 1/40

(Continued)

*Primary Examiner* — Ricardo I Magallanes
*Assistant Examiner* — Jordan E. DeWitt
(74) *Attorney, Agent, or Firm* — Burr & Forman LLP

(57) ABSTRACT

A cross dipole antenna element may include a flexible substrate, a first pair of dipole arms disposed on the flexible substrate, a second pair of dipole arms disposed on the flexible substrate, a plurality of feed points disposed at a center portion of the flexible substrate and between the first and second pairs of dipole arms, a metallic plate forming a ground plane for the antenna element, and a dielectric spacer disposed between the center portion of the flexible substrate and the metallic plate. The first and second pairs of dipole arms may be operably coupled to the metallic plate at distal ends of the first and second pairs of dipole arms relative to the center portion.

14 Claims, 7 Drawing Sheets

(56) References Cited

U.S. PATENT DOCUMENTS 5,521,610 A * 5/1996 Rodal .................... H01Q 23/00
343/797
5,568,162 A * 10/1996 Samsel .................. H01Q 21/28
343/788
6,211,840 B1 * 4/2001 Wood ..................... H01Q 9/065
343/793
6,452,565 B1 * 9/2002 Kingsley .............. H01Q 9/0492
343/873
6,522,302 B1 * 2/2003 Iwasaki .................. H01Q 9/265
343/866
7,084,830 B1 * 8/2006 Suh ........................ H01Q 9/285
343/893
8,994,594 B1 * 3/2015 Wilson ................. H01Q 9/0407
343/893
10,008,779 B2 * 6/2018 Boryssenko ........... H01Q 25/00
11,050,131 B2 * 6/2021 Wu .......................... H01Q 1/12
11,336,031 B2 * 5/2022 Wang ................... H01Q 19/108
2003/0210193 A1 * 11/2003 Rossman ............. H01Q 9/0464
343/700 MS
2003/0222830 A1 * 12/2003 Harel ....................... H01Q 9/44
343/797
2006/0250317 A1 * 11/2006 Regala ..................... H01Q 1/40
343/705
2007/0222696 A1 * 9/2007 Wikstrom ............ H01Q 21/067
343/797
2008/0074339 A1 * 3/2008 Lee .......................... H01Q 9/26
343/803
2009/0179814 A1 * 7/2009 Park ....................... H01Q 21/26
343/810
2010/0007572 A1 * 1/2010 Jones ....................... H01Q 9/28
343/798
2012/0075155 A1 * 3/2012 Lindmark ............ H01Q 19/106
343/834
2013/0088402 A1 * 4/2013 Lindmark .............. H01Q 1/246
343/848
2014/0125539 A1 * 5/2014 Katipally ............... H01Q 21/26
343/794
2014/0240188 A1 * 8/2014 Mamo .................... H01Q 21/26
343/798
2014/0247194 A1 * 9/2014 Durnan .................... H01Q 3/26
343/867
2014/0320371 A1 * 10/2014 Iso ..................... H01Q 21/0081
343/848
2015/0263434 A1 * 9/2015 Bench ...................... H01Q 5/48
343/879
2016/0006128 A1 * 1/2016 Yamamoto ............... H01Q 9/42
29/601
2017/0149145 A1 * 5/2017 Payne ...................... H01Q 1/36
2020/0106195 A1 * 4/2020 Fleancu ................... H01Q 9/20
2020/0373668 A1 * 11/2020 Wu ........................ H01Q 9/285
2021/0194134 A1 * 6/2021 Kimura .................. H01Q 9/045
2021/0320433 A1 * 10/2021 Liu .......................... H01Q 5/48
2021/0344122 A1 * 11/2021 Kaistha ................ H01Q 19/108
2021/0367328 A1 * 11/2021 Ai ........................ H01Q 19/108
2021/0391657 A1 * 12/2021 Chen ...................... H01Q 21/26
2022/0285857 A1 * 9/2022 Pollayi ................... H01Q 21/24
2022/0344823 A1 * 10/2022 Panther .................. H01Q 21/26
2023/0369747 A1 * 11/2023 Yang ...................... H01Q 1/246
2023/0395995 A1 * 12/2023 Sissoev ................ H01Q 19/108

FOREIGN PATENT DOCUMENTS

JP 06334436 A * 12/1994
JP 2016029858 A * 3/2016 ............... H01Q 1/12
WO WO-8103398 A * 11/1981 ............. H01Q 1/286
WO WO-2021007198 A1 * 1/2021 ............. H01Q 1/246

* cited by examiner

CROSS DIPOLE CIRCULARLY POLARIZED ANTENNA

TECHNICAL FIELD

Example embodiments generally relate to antennas and in particular, relate to a circularly polarized omnidirectional cross dipole antenna for airborne satellite communication systems.

BACKGROUND

Modern aircraft rely heavily on satellite communication links. As data loads in these links increase, so do the link quality requirements on the antennas. The main contributing factor to antenna quality is its radiation pattern fidelity. At the same time, the physical package geometry of an airborne antenna cannot be arbitrary, since it is mounted on and becomes a part of the aircraft body, which has strict aerodynamic constraints.

For example, antennas may be required to have low profile form factor, narrow and nonuniform width, etc. This often leads to the antenna physical shape not being symmetrical around the axis normal to the aircraft surface. This physical asymmetry may also lead to an asymmetrical antenna radiation pattern. However, for an omnidirectional antenna, the radiation pattern symmetry is one of the main quality metrics. In addition, the aircraft body presents a ground plane which alters antenna radiation pattern as well. Furthermore, in a conventional planar cross dipole antenna, (circularly polarized) radiation pattern gain distribution is skewed toward its bore sight (zenith), which may not be desirable for some applications.

Accordingly, the present invention proposes an alternative printed circularly polarized omnidirectional cross dipole antenna geometry and additional apparatus to enable extra degrees of freedom in order to mitigate the aforementioned effects.

BRIEF SUMMARY OF SOME EXAMPLES

In an example embodiment, a cross dipole antenna may be provided. The cross dipole antenna may include a flexible substrate, a first pair of dipole arms disposed on the flexible substrate, a second pair of dipole arms disposed on the flexible substrate, a plurality of feed points disposed at a center portion of the flexible substrate and between the first and second pairs of dipole arms, a metallic plate forming a ground plane for the antenna element, and a dielectric spacer disposed between the center portion of the flexible substrate and the metallic plate. The first and second pairs of dipole arms may be operably coupled to the metallic plate at distal ends of the first and second pairs of dipole arms relative to the center portion.

In another example embodiment, an antenna assembly may be provided. The antenna assembly may include a cross dipole antenna element, an antenna body configured to be operably coupled to a fuselage of an aircraft, and a radome enclosing the antenna element between the radome and the antenna body. The antenna element may include a flexible substrate, a first pair of dipole arms disposed on the flexible substrate, a second pair of dipole arms disposed on the flexible substrate, a plurality of feed points disposed at a center portion of the flexible substrate and between the first and second pairs of dipole arms, a metallic plate forming a ground plane for the antenna element, and a dielectric spacer disposed between the center portion of the flexible substrate and the metallic plate. The first and second pairs of dipole arms may be operably coupled to the metallic plate at distal ends of the first and second pairs of dipole arms relative to the center portion.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
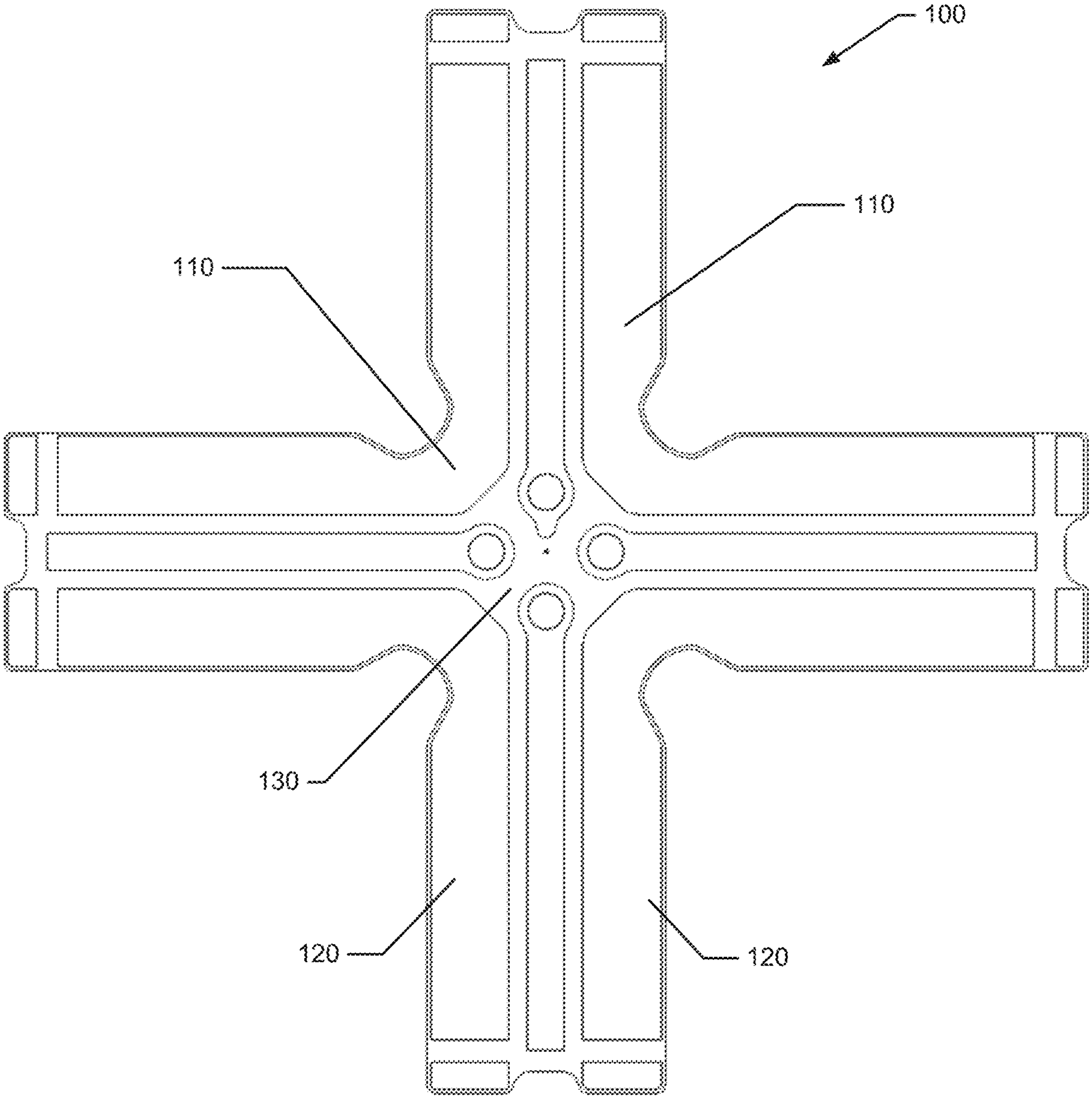
FIG. 1 illustrates a top view of a cross dipole antenna of an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Referring now to FIG. 1, a cross dipole antenna 100 of an example embodiment is shown. The cross dipole antenna assembly 100 may include a first pair of dipole arms 110 and a second pair of dipole arms 120 that may be printed on a flexible substrate 130 of dielectric material. In the depicted example, the four arms of the first and second pairs of dipole arms 110 and 120 may each be conductors that have an L or V shape that is geometrically identical. However, the four arms of the first and second pairs of dipole arms 110 and 120 may be arranged with their apexes proximate to each other. Meanwhile, the four arms of the first and second pairs of dipole arms 110 and 120 may also orthogonally cross each other in the substrate plane. The four arms of the first and second pairs of dipole arms 110 and 120 may also have feed points 140, 142, 144 and 146 at respective four corners of a centrally located square shape.

Figure 2:
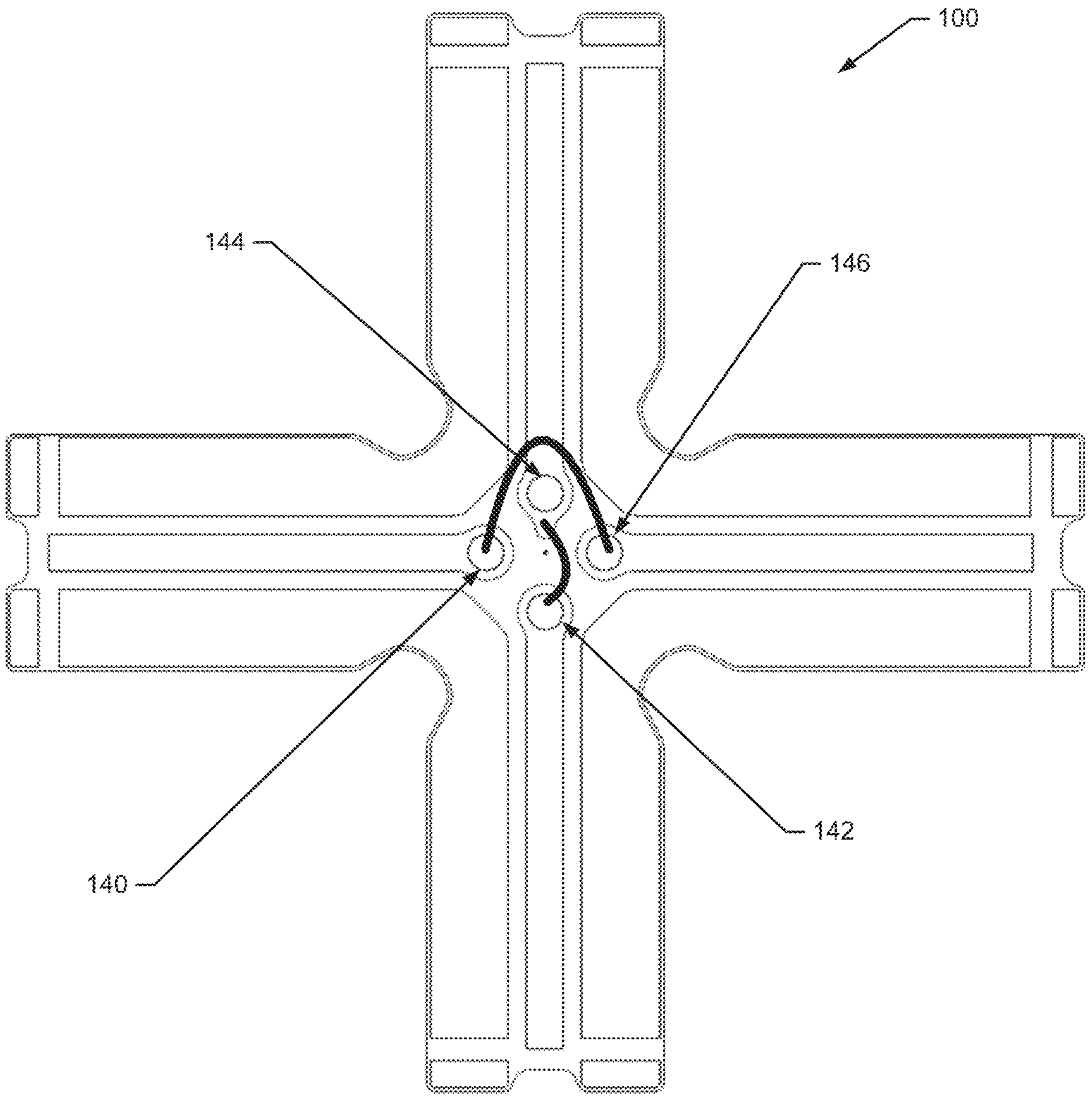
FIG. 2 illustrates a top view of the cross dipole antenna including some interconnections applied thereon in accordance with an example embodiment.

FIG. 2 illustrates how the feed points 140, 142, 144 and 146 (each of which may be disposed at a proximal end of a radially outwardly extending conductor) may be utilized in one example embodiment. In this regard, the feed points 140, 142, 144 and 146 may be operably coupled to a radio, each other, and/or other external components via coaxial cables. For example, four coax cables may be perpendicular to the substrate 130, which may be used to feed the four arms of the cross dipole antenna 100 at the feed points 140, 142, 144 and 146. In an example embodiment, two central pins of two neighboring coax cables (e.g., feed points 140 and 142) may be electrically connected to two neighbor arms crossing these cables at the feed points (Coax A and B), and the two shields of the cables that may be electrically connected to the other two neighboring arms on the same side. The shields of another two cables without central pins (called dummy cables) may also be connected electrically to the arms at the feed points (e.g., feed points 144 and 146) which may already be connected to the pins of the first two cables (Dummy Coax A and B). The two orthogonal crossed dipoles may thus be formed. The orthogonal crossed dipoles may each have a coax cable feed, and each coax cable feed may be powered by RF signals with $\phi=\pi/2$ phase difference to radiate either a right-hand CP wave or a left-hand CP wave.

The polarized wave dynamics in the cross dipole antenna 100 may be described by the normalized Jones vector:

$$|\psi\rangle = \begin{pmatrix} \psi_x \\ \psi_y \end{pmatrix} = \begin{pmatrix} \cos\theta e^{j\alpha} \\ \sin\theta e^{j\alpha\pm\phi} \end{pmatrix},$$

where $\alpha$ is the polarization angle, $\phi$ is the polarization offset, and the wave may oscillate in the XY plane. For example if:

$$\phi = \frac{\pi}{2}$$

then the Jones vector becomes:

$$|\psi\rangle = \frac{1}{\sqrt{2}}\begin{pmatrix} 1 \\ \pm j \end{pmatrix} e^{j\alpha}$$

and the antenna pattern becomes circularly polarized if the element is fed with this condition. With −j producing Right-Hand Circularly Polarized (RHCP) pattern and +j Left-Hand Circularly Polarized Pattern.

An antenna backing cavity may be introduced in the form of metal bounded region between the element and the ground plane, the fields created within this cavity may be expressed as a sum of transverse electric and transverse magnetic components in normal to the ground plane Z direction ($TE_Z$ and $TM_Z$, respectively) via vector potential components $F_Z$ and $A_Z$:

$$A_Z(\rho, \phi, z) \sum_{n=-\infty}^{\infty} \sum_{q=0}^{\infty} \tilde{A}_z^{ec}(\rho, n, q) e^{-jn\phi} \cos\left[\frac{q\pi}{L_{zc}}(z - z_{1c})\right]$$

$$F_Z(\rho, \phi, z) \sum_{n=-\infty}^{\infty} \sum_{q=0}^{\infty} \tilde{F}_z^{es}(\rho, n, q) e^{-jn\phi} \sin\left[\frac{q\pi}{L_{zc}}(z - z_{1c})\right]$$

$$\tilde{A}_z^{ec} = \mathcal{F}_z \cos$$

$$\tilde{F}_z^{es} = \mathcal{F}_z \sin,$$

in terms of exponential Fourier cosine and sine series in z. And where $z_{1c}$ and $z_{2c}$ may be physical cavity wall locations, and $L_{zc}=(z_{2c}-z_{1c})$. These fields may impact the overall antenna radiation pattern, and as shown, may depend on the geometry of the backing cavity. Example embodiments may therefore provide a structure for a cross dipole antenna 100 that achieves these objectives, as shown by the exemplary structures described herein.

Figure 3:
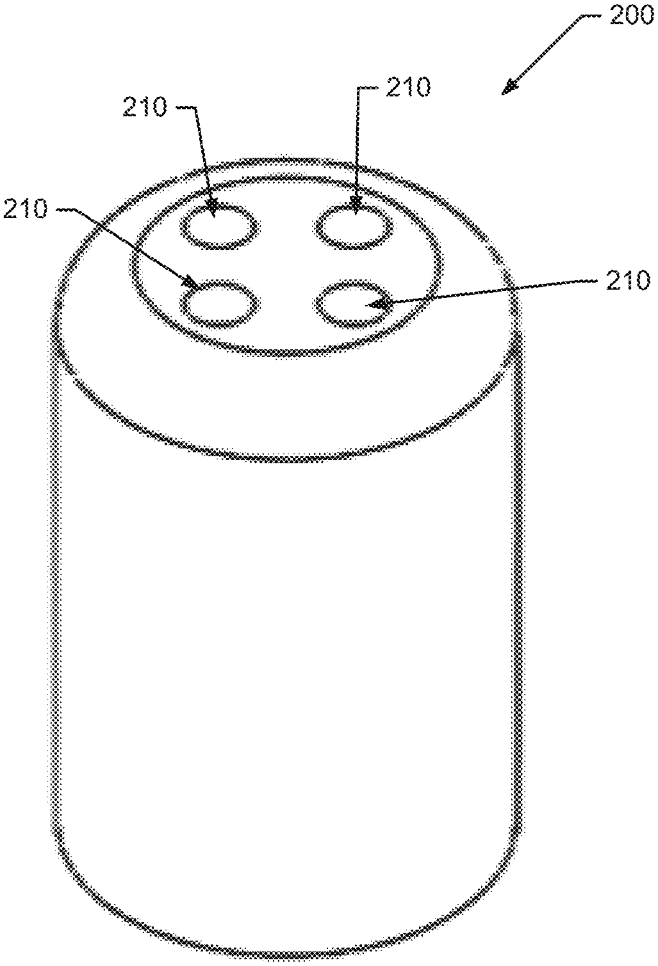
FIG. 3 illustrates a perspective view of a dielectric cylindrical spacer usable with the cross dipole antenna of FIG. 1 in accordance with an example embodiment.

As noted above, the cross dipole antenna 100 is printed on the flexible substrate 130. This renders the cross dipole antenna 100 capable of being adapted to the shape of a base component upon which the cross dipole antenna 100 may be mounted. Thus, for example, if the cross dipole antenna 100 is mounted to a curved, domed, or otherwise not flat structure, the cross dipole antenna 100 may take the shape of or dictated by the corresponding mounting structure. In some example embodiments, the mounting structure may be or produce a domed or mushroom shape. This, of course increases the depth dimension of the cross dipole antenna 100, and may therefore require the use of a spacer at a center portion thereof. FIG. 3 illustrates a cylindrically shaped dielectric spacer 200, which may serve as the spacer mentioned above. Notably, the dielectric spacer 200 includes channels 210 formed therein that correspond to the feed points 140, 142, 144 and 146 of the cross dipole antenna 100 to permit the coax cables described above to pass therethrough.

Figure 4:
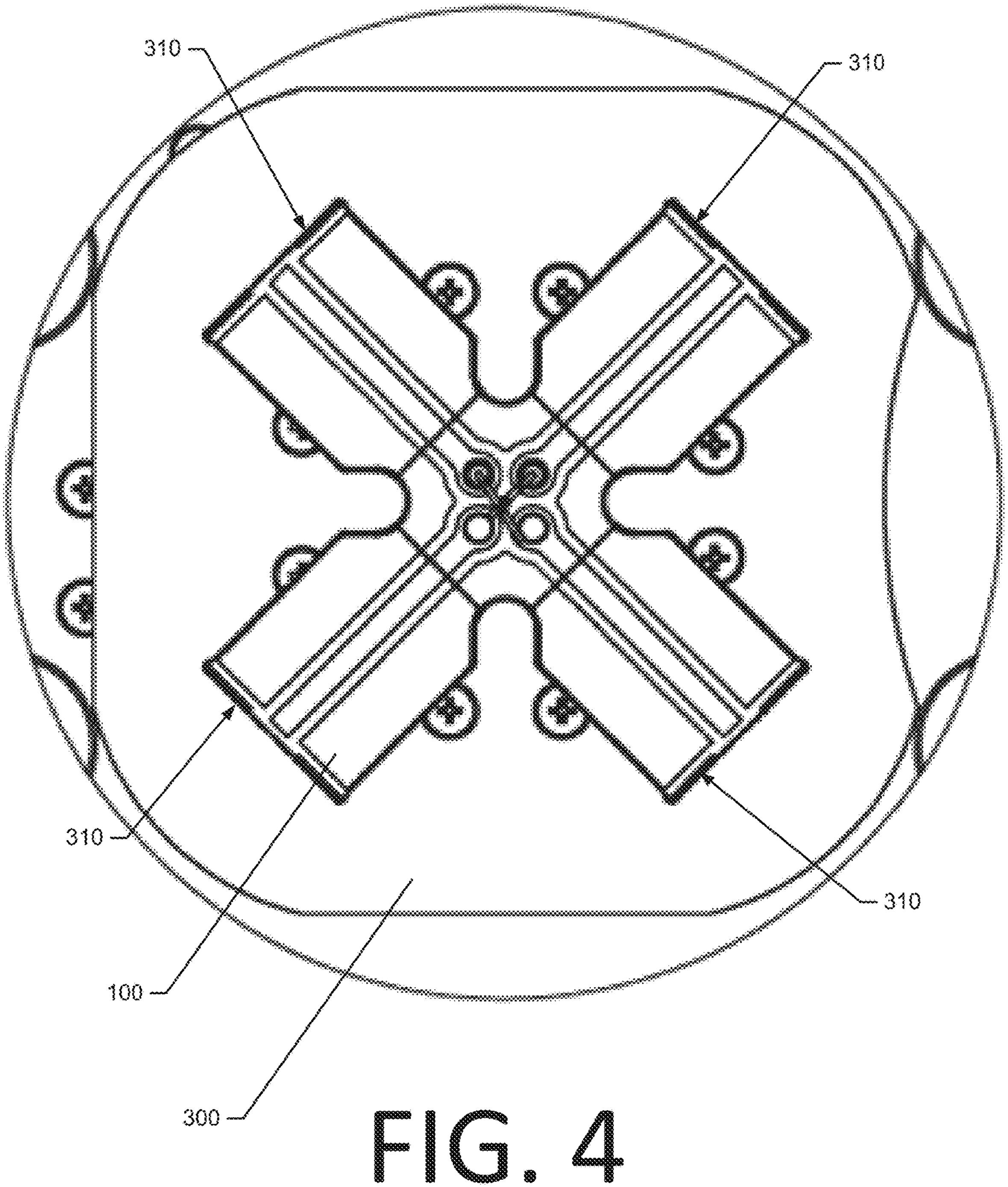
FIG. 4 illustrates a top view of the cross dipole antenna of FIG. 1, operably coupled to a metallic plate in accordance with an example embodiment.
Figure 5:
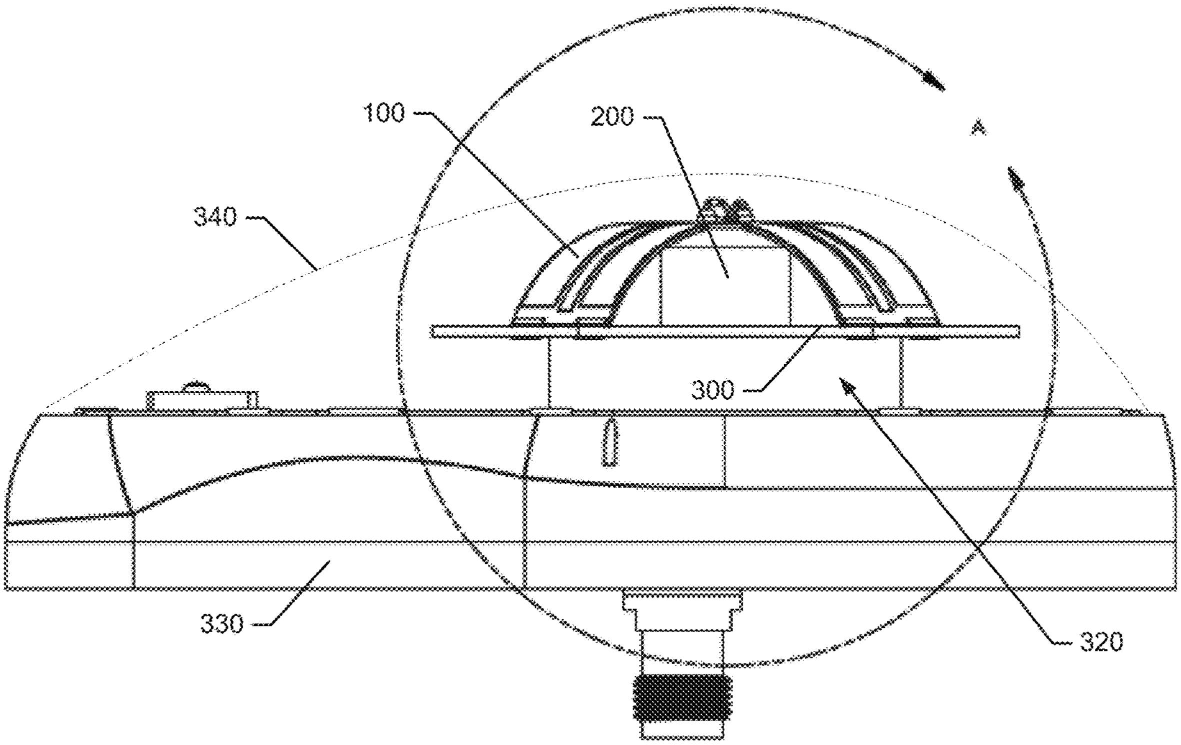
FIG. 5 illustrates a side view of the cross dipole antenna assembly employing the antenna of FIG. 1 in accordance with an example embodiment.
Figure 6:
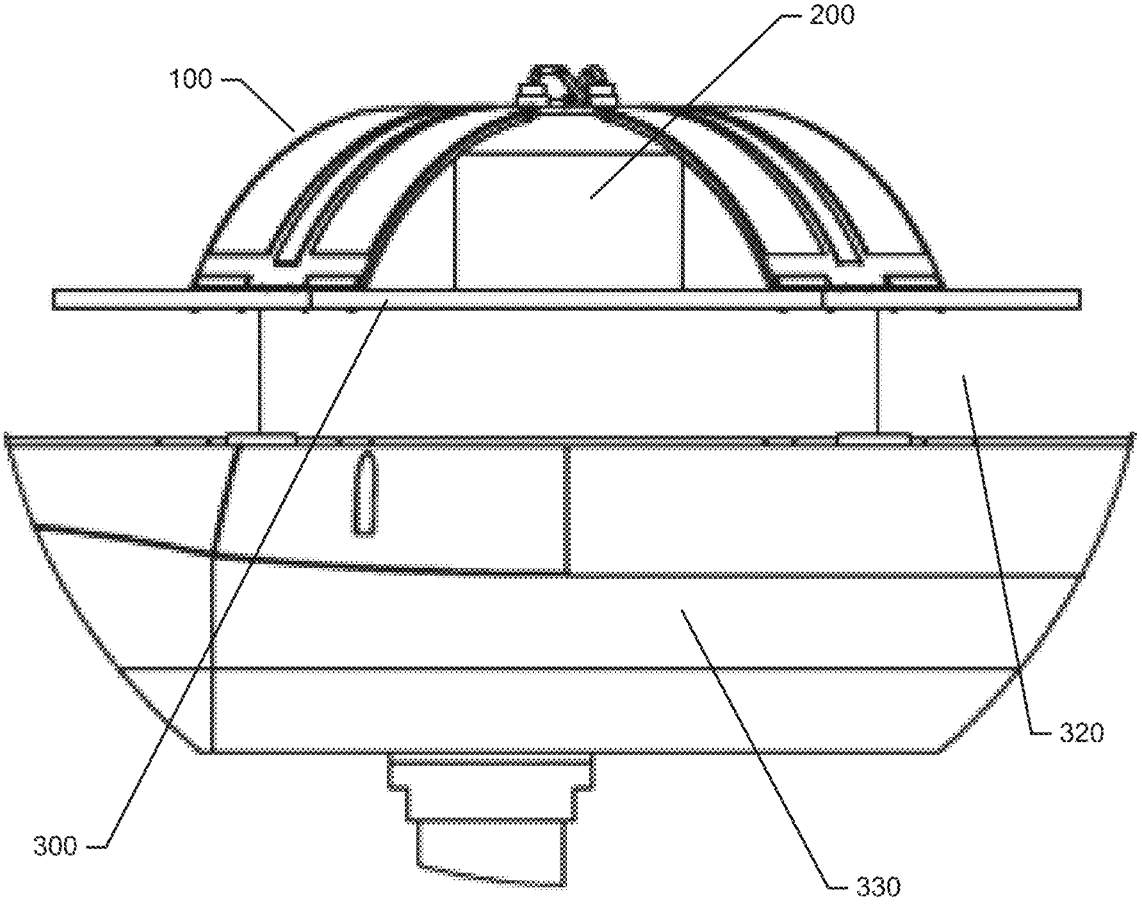
FIG. 6 illustrates a front view of the cross dipole antenna assembly employing the antenna of FIG. 1 in accordance with an example embodiment.
Figure 7:
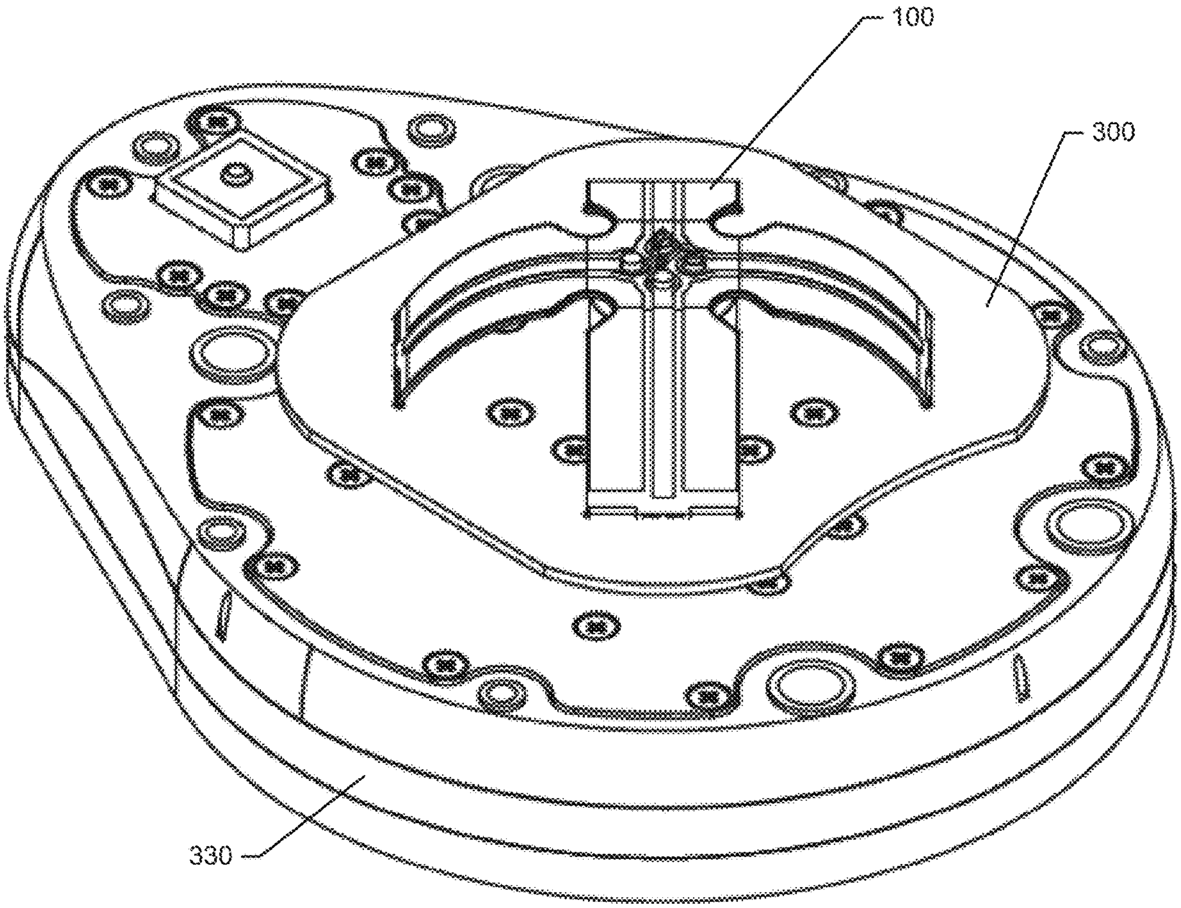
FIG. 7 illustrates a perspective view of the cross dipole antenna assembly employing the antenna of FIG. 1 in accordance with an example embodiment.

Referring now to FIGS. 4-6, the cross dipole antenna 100 of FIG. 1 may be mounted on a metallic plate 300. The metallic plate 300 may have any desirable outline shape for mounting the cross dipole antenna 100 thereon. However, in this example, the outline shape of the metallic plate 300 is flat, but includes slots 310 that are formed closer together than the length of the cross dipole antenna 100. Thus, the cross dipole antenna 100 can be mounted with its ends inserted into the slots 310 and the dielectric spacer 200 at its center to form a domed or mushroom shape. In particular, for example, the flexible substrate 130 with printed respective first and second pairs of dipole arms 110 and 120 may be bent with a certain curvature radius matching that provided by fitting the ends into the slots 310 of the metallic plate 300. Thus, the distal ends of the substrate 130 (e.g., the ends opposite the feed points 140, 142, 144 and 146) may be inserted into the slots 310 that may be prefabricated on the top portion of the metallic plate 300. The distal ends of the substrate 130 may then be soldered to the metallic plate 300 to retain the cross dipole antenna 100 on the metallic plate 300.

This mounting strategy holds the cross dipole antenna 100 in a way that forms a raised printed cross dipole element construction that creates a dome structure an optimizes gain away from the zenith. The dome or mushroom shape also creates a backing cavity 320 between the metallic plate 300 and an antenna body 330 by spacing the metallic plate 300 apart from the antenna body 330. The metallic plate 300 acts as a secondary ground plate (with the fuselage or other portion of the structure to which the antenna body 330 is mounted forming a primary ground plane). The metallic plate 300 with the cross dipole antenna 100 affixed thereon may thus be mounted, with an optimized height, on the antenna body 330 under a radome (represented by dashed line 340 in FIG. 5). By manipulating the shape and height of the secondary (mushroom) ground plane formed by the metallic plate 300, the antenna pattern shape of the cross dipole antenna 100 may be effectively optimized as shown in FIG. 6.

Thus, according to an example embodiment, a cross dipole antenna element may be provided. The antenna element may include a flexible substrate, a first pair of dipole arms disposed on the flexible substrate, a second pair of dipole arms disposed on the flexible substrate, a plurality of feed points disposed at a center portion of the flexible substrate and between the first and second pairs of dipole arms, a metallic plate forming a ground plane for the antenna element, and a dielectric spacer disposed between the center portion of the flexible substrate and the metallic plate. The first and second pairs of dipole arms may be operably coupled to the metallic plate at distal ends of the first and second pairs of dipole arms relative to the center portion.

In some embodiments, the antenna element may include additional components/modules, optional features, and/or the components/features described above may be modified or augmented. Some examples of modifications, optional features and augmentations are described below. It should be appreciated that the modifications, optional features and augmentations may each be added alone, or they may be added cumulatively in any desirable combination. In this regard, for example, the first and second pairs of dipole arms may extend away from the center portion by a first length defined between the distal ends, and slots may be formed in the metallic plate separated by a second length that is less than the first length. The distal ends of the first and second pairs of dipole arms may be operably coupled to the metallic plate at the slots. In some cases, the distal ends of the first and second pairs of dipole arms may be soldered to the metallic plate at the slots. In an example embodiment, the first and second pairs of dipole arms may each include conductors having a V or L shape, where the apexes of the V or L shape are disposed proximate to the feed points. In some cases, the dielectric spacer may have a cylindrical shape with channels formed therein corresponding to the feed points. In an example embodiment, the flexible substrate may be affixed to the metallic plate to form a dome or mushroom shape. In some cases, the metallic plate may be disposed a predetermined distance from an antenna body to form a backing cavity between the metallic plate and the antenna body. In an example embodiment, the metallic plate may form a secondary ground plane and a fuselage of an aircraft forms a primary ground plane for the antenna element. In some cases, an antenna pattern generated by the antenna element may be circularly polarized. In an example embodiment, feed points disposed opposite each other may be operably coupled to each other.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A cross dipole antenna element comprising:

a flexible substrate;

a first pair of dipole arms disposed on the flexible substrate;

a second pair of dipole arms disposed on the flexible substrate;

a plurality of feed points disposed at a center portion of the flexible substrate and between the first and second pairs of dipole arms;

a metallic plate forming a ground plane for the antenna element; and a dielectric spacer disposed between the center portion of the flexible substrate and the metallic plate, wherein the first and second pairs of dipole arms are attached to the metallic plate at distal ends of the first and second pairs of dipole arms relative to the center portion, wherein the dielectric spacer has a cylindrical shape with channels formed therein corresponding to the feed points, wherein the dielectric spacer contacts both the flexible substrate and the metallic plate at opposite longitudinal ends of the dielectric spacer, wherein the metallic plate is disposed a predetermined distance from an antenna body to form a backing cavity between the metallic plate and the antenna body, wherein the first and second pairs of dipole arms extend away from the center portion by a first length defined between the distal ends, wherein slots are formed in the metallic plate separated by a second length that is less than the first length, the distal ends of the first and second pairs of dipole arms being operably coupled to the metallic plate at the slots, and wherein the cross dipole antenna element is mounted on the antenna body.

2. The antenna element of claim 1, wherein the distal ends of the first and second pairs of dipole arms are soldered to the metallic plate at the slots.

3. The antenna element of claim 1, wherein the first and second pairs of dipole arms each comprise conductors having a V or L shape, and wherein apexes of the V or L shape are disposed proximate to the feed points.

4. The antenna element of claim 1, wherein the flexible substrate is affixed to the metallic plate to form a dome or mushroom shape.

5. The antenna element of claim 1, wherein the metallic plate forms a secondary ground plane and a fuselage of an aircraft forms a primary ground plane for the antenna element.

6. The antenna element of claim 1, wherein an antenna pattern generated by the antenna element is circularly polarized.

7. The antenna element of claim 1, wherein feed points disposed opposite each other are operably coupled to each other.

8. An antenna assembly comprising:

a cross dipole antenna element;

an antenna body configured to be operably coupled to a fuselage of an aircraft; and a radome enclosing the antenna element between the radome and the antenna body, wherein the antenna element comprises:

a flexible substrate, a first pair of dipole arms disposed on the flexible substrate, a second pair of dipole arms disposed on the flexible substrate, a plurality of feed points disposed at a center portion of the flexible substrate and between the first and second pairs of dipole arms, a metallic plate forming a ground plane for the antenna element, and a dielectric spacer disposed between the center portion of the flexible substrate and the metallic plate, wherein the first and second pairs of dipole arms are attached to the metallic plate at distal ends of the first and second pairs of dipole arms relative to the center portion, wherein the dielectric spacer has a cylindrical shape with channels formed therein corresponding to the feed points, wherein the dielectric spacer contacts both the flexible substrate and the metallic plate at opposite longitudinal ends of the dielectric spacer, and wherein the metallic plate is disposed a predetermined distance from an antenna body to form a backing cavity between the metallic plate and the antenna body, wherein the first and second pairs of dipole arms extend away from the center portion by a first length defined between the distal ends, and wherein slots are formed in the metallic plate separated by a second length that is less than the first length, the distal ends of the first and second pairs of dipole arms being operably coupled to the metallic plate at the slots.

9. The antenna assembly of claim 8, wherein the distal ends of the first and second pairs of dipole arms are soldered to the metallic plate at the slots.

10. The antenna assembly of claim 8, wherein the first and second pairs of dipole arms each comprise conductors having a V or L shape, and wherein apexes of the V or L shape are disposed proximate to the feed points.

11. The antenna assembly of claim 8, wherein the flexible substrate is affixed to the metallic plate to form a dome or mushroom shape.

12. The antenna assembly of claim 8, wherein the metallic plate forms a secondary ground plane and the fuselage of the aircraft forms a primary ground plane for the antenna element.

13. The antenna assembly of claim 8, wherein an antenna pattern generated by the antenna element is circularly polarized.

14. The antenna assembly of claim 8, wherein feed points disposed opposite each other are operably coupled to each other.

* * * * *